United States Patent
Inoue

(10) Patent No.: US 9,160,947 B2
(45) Date of Patent: Oct. 13, 2015

(54) DEFECTIVE PIXEL CORRECTION APPARATUS AND METHOD

(71) Applicant: PANASONIC CORPORATION, Osaka (JP)

(72) Inventor: Tadayuki Inoue, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/175,764

(22) Filed: Feb. 7, 2014

(65) Prior Publication Data
US 2014/0232909 A1 Aug. 21, 2014

(30) Foreign Application Priority Data

Feb. 18, 2013 (JP) .................................. 2013-028697
Aug. 21, 2013 (JP) .................................. 2013-171029

(51) Int. Cl.
*H04N 5/357* (2011.01)
*H04N 5/367* (2011.01)

(52) U.S. Cl.
CPC ........... *H04N 5/3572* (2013.01); *H04N 5/3675* (2013.01)

(58) Field of Classification Search
CPC .... G09G 2330/10; G06T 5/005; H04N 5/335; H04N 5/341; H04N 5/347; H04N 5/351; H04N 5/357; H04N 5/3575; H04N 5/3572; H04N 5/3577; H04N 5/359; H04N 5/3591; H04N 5/3592; H04N 5/3594; H04N 5/3595; H04N 5/3597; H04N 5/3598; H04N 5/361; H04N 5/363; H04N 5/3655; H04N 5/3656; H04N 5/3658; H04N 5/367; H04N 5/3675; H04N 5/3696; H04N 7/0135; H04N 7/0145; H04N 7/0147; H04N 19/80; H04N 19/635; H04N 19/86
USPC ......................................................... 348/246
See application file for complete search history.

(56) References Cited

U.S. PATENT DOCUMENTS 6,081,917 A 6/2000 Yasui et al.
7,656,443 B2 * 2/2010 Ikeda ............................ 348/246
(Continued)

FOREIGN PATENT DOCUMENTS

JP 2006-165899 A 6/2006
JP 3830574 B2 7/2006
(Continued)

*Primary Examiner* — Pritham Prabhakher
(74) *Attorney, Agent, or Firm* — McDermott Will & Emery LLP

(57) ABSTRACT

A defective pixel correction apparatus and a defective pixel correction method of the present technique include a first defective pixel corrector for specifying a defective pixel included in an image signal of each of color signals sent from an imaging unit, and obtaining a linear interpolation value from pixels around the defective pixel to perform a first defective pixel correction process on the defective pixel by linear interpolation. Further, the defective pixel correction apparatus and the defective pixel correction method include a second defective pixel corrector for performing an aberration correction process based on an image signal of a specific color after the first defective pixel correction process, and performing a second defective pixel correction process different from the first defective pixel correction process on the pixel that has been subjected to the first defective pixel correction process.

5 Claims, 9 Drawing Sheets

(56) References Cited

U.S. PATENT DOCUMENTS

| | | | |
|---|---|---|---|
| 7,872,679 B2* | 1/2011 | Hara | 348/247 |
| 2003/0025813 A1* | 2/2003 | Yoshiwara et al. | 348/246 |
| 2007/0165119 A1* | 7/2007 | Ikeda | 348/246 |
| 2008/0158396 A1* | 7/2008 | Fainstain et al. | 348/246 |
| 2012/0147224 A1* | 6/2012 | Takayama | 348/241 |
| 2012/0201454 A1* | 8/2012 | Sato et al. | 382/167 |

FOREIGN PATENT DOCUMENTS

| | | |
|---|---|---|
| JP | 2009-261025 A | 11/2009 |
| JP | 2011-109572 A | 6/2011 |

* cited by examiner

DEFECTIVE PIXEL CORRECTION APPARATUS AND METHOD

RELATED APPLICATIONS

This application claims the benefit of Japanese Application No. 2013-171029, filed on Aug. 21, 2013 and Japanese Application No. 2013-028697, filed on Feb. 18, 2013, the disclosures of which Applications are incorporated by reference herein.

BACKGROUND OF THE INVENTION

1. Field of the Invention

The present technique relates to an apparatus and a method for correcting defective pixels in imaging signals caused by pixel defects of a solid-state image sensor in an imaging apparatus such as a digital still camera or a digital video camera.

2. Description of the Related Art

In recent years, solid-state image sensors (hereinafter, image sensors), such as CCDs (Charge Coupled Devices) and CMOSs (Complementary Metal-Oxide Semiconductors), are being miniaturized and increased in the number of pixels with the advancement of semiconductor microfabrication technique. On the other hand, with the increase in the number of pixels, some of pixels that do not output a normal signal level in the image sensors, namely, so-called defected pixels also increase in the number.

As a result, the importance of a defective pixel correction technique for electrically interpolating and outputting a signal level to be originally obtained in defective pixels is being increased.

As a defective pixel correction method, for example, a technique described in Japanese Patent Publication No. 3830574 is known. Japanese Patent Publication No. 3830574 discloses a defective pixel correction method to be used in a so-called 3CCD imaging apparatus, which uses three CCDs as image sensors and outputs image signals of three primary colors including red (R), green (G), and blue (B) from the CCDs, respectively.

FIGS. 1A to 1C are explanatory diagrams for describing a defective pixel correction method when a defective pixel is present in an R channel (Rch) color signal.

As shown in FIG. 1A, a case where a defective pixel P(i) is present in an Rch color signal of a captured image is described as an example.

In signals of the same color in which a defective pixel P(i) is present, signal values of normal pixels P(i−1) and P(i+1) before and after the defective pixel Pi are added and averaged as shown in FIG. 1B, so that a linear interpolation value Px is generated. Thereafter, as shown in FIG. 1C, a high-frequency component GH of a pixel on the same position as the defective pixel P(i) is generated based on another color signal different from the color signal where the defective pixel P(i) is present (in FIG. 1C, G channel (Gch)). Thereafter, a correction value GH is added to the linear interpolation value Px, so that a correction process can be performed on the defective pixel P(i) of the Rch color signal.

An imaging apparatus that captures a subject forms a subject image on imaging surfaces of the image sensors via an optical system such as a lens. The image sensors photoelectrically convert light beams incident on the respective pixels so as to output them as electric signals. On the other hand, since the imaging magnification of the lens in the optical system varies with a light wavelength due to magnification chromatic aberration, even when a subject of achromatic color, for example, is imaged, pixel positions on the image sensors where R, G, and B light beams are imaged displace. As a result, an outline or the like of the subject is colored due to color shift.

Unexamined Japanese Patent Publication No. 2006-165899 discloses a defective pixels corrective method in a case where such magnification chromatic aberration of an optical system occurs. Unexamined Japanese Patent Publication No. 2006-165899 discloses a method for selecting a defective pixel correction method according to a position of a defective pixel.

SUMMARY OF THE INVENTION

A defective pixel correction apparatus and a defective pixel correction method of the present technique include a first defective pixel corrector for specifying a defective pixel included in an image signal of each of color signals sent from an imaging unit, and obtaining a linear interpolation value from pixels around the defective pixel to perform a first defective pixel correction process on the defective pixel by linear interpolation. Further, the defective pixel correction apparatus and the defective pixel correction method include a second defective pixel corrector for performing an aberration correction process based on an image signal of a specific color after the first defective pixel correction process, and performing a second defective pixel correction process different from the first defective pixel correction process on the pixel that has been subjected to the first defective pixel correction process.

DETAILED DESCRIPTION OF THE PREFERRED EMBODIMENT

A defective pixel correction method and a defective pixel correction apparatus to be used in an imaging apparatus are described as one example of a defective pixel correction method and a defective pixel correction apparatus according to one embodiment of the present technique. Descriptions that are detailed more than necessary may be omitted. For example, detailed description of already well-known matters and overlapping description about the substantially same configurations may be omitted. This is for avoiding the following description from being unnecessarily redundant and for a person skilled in the art to easily understand the description.

The inventors provide the accompanying drawings and the following description so that the person skilled in the art can sufficiently understand the present technique, and thus do not intend to limit the subject matter of the present technique described in the claims.

Figure 1A:
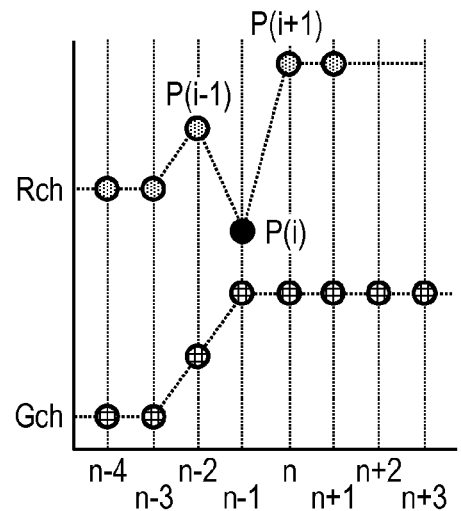
FIG. 1A is an explanatory diagram for describing a defective pixel correction method in a case where a defective pixel is present in an R channel (Rch) color signal.
Figure 1B:
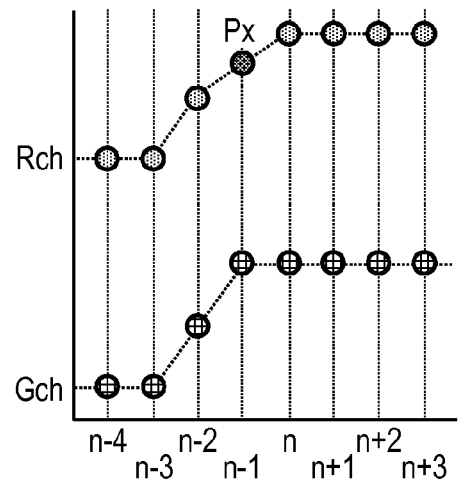
FIG. 1B is an explanatory diagram for describing the defective pixel correction method in the case where a defective pixel is present in the R channel (Rch) color signal.
Figure 1C:
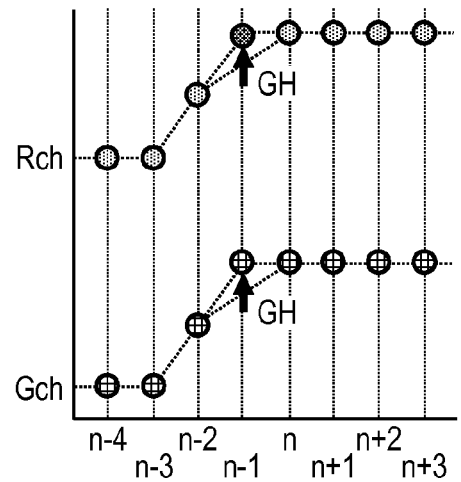
FIG. 1C is an explanatory diagram for describing the defective pixel correction method in the case where a defective pixel is present in the R channel (Rch) color signal.
Figure 2:
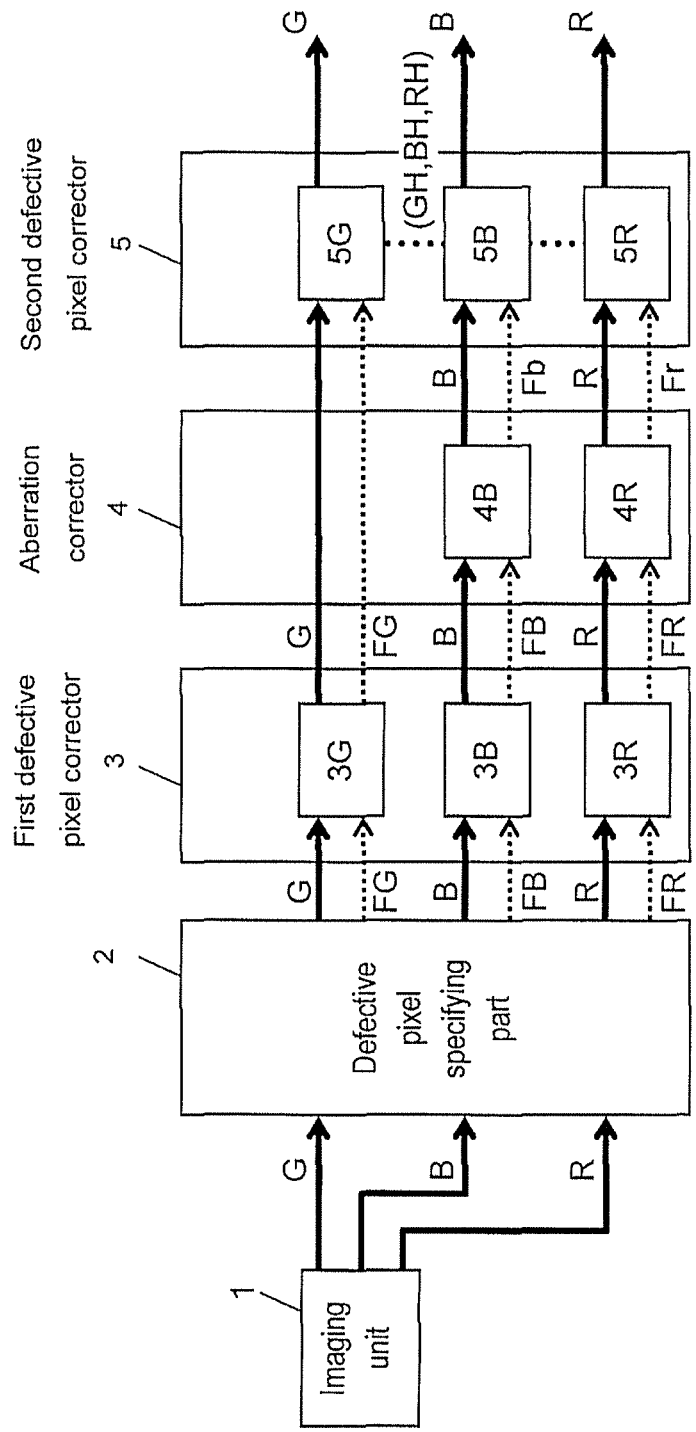
FIG. 2 is a block diagram illustrating an entire configuration of an imaging apparatus having a defective pixel correction apparatus according to one embodiment of the present technique.

FIG. 2 is a block diagram illustrating an entire configuration of an imaging apparatus having a defective pixel correction apparatus according to one embodiment of the present technique.

As shown in FIG. 2, imaging unit 1 has an image sensor such as a CCD. The image sensor captures a subject so as to perform photoelectric conversion, and outputs image signals of three-primary colors including R, G, and B as electric signals.

The defective pixel correction apparatus has defective pixel specifying part 2, first defective pixel corrector 3, aberration corrector 4, and second defective pixel corrector 5.

Defective pixel specifying part 2 specifies defective pixels on image signals for channels of respective color signals of R, G, B input from imaging unit 1, and outputs signals of defective pixel flags indicating positions of the defective pixels together with image signals at the same timing.

First defective pixel corrector 3 has correctors 3R, 3G, and 3B into which image signals of R, G, and B channels and signals of the defective pixel flags are input. Each of correctors 3R, 3G, and 3B adds and averages signals of pixels around the defective pixel included in each of the R, G, and B channel image signals based on each of the signals of the defective pixel flags so as to obtain each linear interpolation value, and performs a first defective pixel correction process by linear interpolation.

Aberration corrector 4 has correctors 4R and 4B into which image signals including signals of the linear interpolation values output from correctors 3R and 3B of first defective pixel corrector 3, and the signals of the defective pixel flags are input. Each of correctors 4R and 4B performs, using a two-dimensional filter, an interpolation process on each of image signals including R and B channel signals on which a linear interpolation process is performed by first defective pixel corrector 3 based on Gch image signal as a specific color signal different from Rch and Bch, and generates and outputs pixel data on the same position as each of the pixel positions of Gch. A so-called magnification chromatic aberration correction process (hereinafter, an aberration correction process) is performed.

Second defective pixel corrector 5 has correctors 5R and 5B into which aberration-corrected image signals output from correctors 4R and 4B of aberration corrector 4 and the signals of the defective pixel flags are input, and corrector 5G into which an image signal including the signal of the linear interpolation value output from corrector 3G of first defective pixel corrector 3 and the signal of the defective pixel flag are input. After first defective pixel corrector 3 performs the linear interpolation process, second defective pixel corrector 5 obtains high-frequency components GH, BH, and RH of Rch and Bch image signals on which aberration corrector 4 performs the aberration correction process and a Gch image signal on which first defective pixel corrector 3 performs the linear interpolation process, and performs a second defective pixel correction process.

Corrector 5G generates high-frequency component GH from the Gch image signal. Correctors 5R and 5B add the high-frequency component GH to the Rch and Bch image signals on which aberration corrector 4 performs the aberration correction process based on the respective channel signals of the defective pixel flags, so as to perform the second defective pixel correction process. As a result, in aberration-corrected image signals of R and B channels, the high-frequency component GH that is generated from Gch into pixel data on the position of the defective pixel is added to the pixels on which first defective pixel corrector 3 has performed the linear interpolation process. Further, correctors 5R and 5B generate the high-frequency components RH and BH of Rch and Bch. Corrector 5G adds a high-frequency component that is generated from at least one of the high-frequency components RH and BH to the Gch image signal on which first defective pixel corrector 3 performs the linear interpolation process based on the Gch signal of the defective pixel flag, so as to perform the second defective pixel correction process. As a result, the high-frequency component that is generated from at least one of the high-frequency components RH and BH of Rch and Bch into the pixel data on the position of the defective pixel is added to the image signal including the linear interpolation value of Gch.

Note that second defective pixel corrector 5 corrects the high-frequency component, and performs the defective pixel correction process different from those of first defective pixel corrector 3 and aberration corrector 4.

As described above, the present technique includes a first defective pixel correction step of specifying a defective pixel included in an image signal of each of color signals sent from the imaging unit, and obtaining the linear interpolation value from pixels around the defective pixel to perform the first defective pixel correction process on the defective pixel by linear interpolation, and a second defective pixel correction step of performing the aberration correction process based on an image signal of a specific color after the first defective pixel correction process, and performing the second defective pixel correction process different from the first defective pixel correction process on the pixel that has been subjected to the first defective pixel correction process.

Further, the second defective pixel correction step includes an aberration correction step of performing the aberration correction process based on the image signal of the specific color. After the aberration correction process is performed in the aberration correction step, the second defective pixel correction process is also performed. The second defective pixel correction process is a correction process for adding the high-frequency component that is generated from an image signal of a different color signal to the pixel subjected to the first defective pixel correction process and the pixels generated by the aberration correction process using the pixels subjected to the first defective pixel correction process.

The present technique further includes a defective pixel specifying step of specifying a defective pixel in an image signal of each of color signals sent from the imaging unit. The first defective pixel correction process and the second defective pixel correction process are performed on the defective pixel specified in the defective pixel specifying step.

Further, in the defective pixel specifying step, the signal of the defective pixel flag indicating the position of the defective pixel is output, and the first defective pixel correction process and the second defective pixel correction process are performed on the defective pixel specified by the defective pixel flag.

FIGS. 3 to 6 are block diagrams illustrating detailed configurations of the respective parts of the defective pixel correction apparatus shown in FIG. 2. FIGS. 7A, 7B, 8A, and 8B are explanatory diagrams for describing operations in the respective parts. FIGS. 7A, 7B, 8A, and 8B illustrate a case where a defective pixel is present on an Rch pixel.

Figure 3:
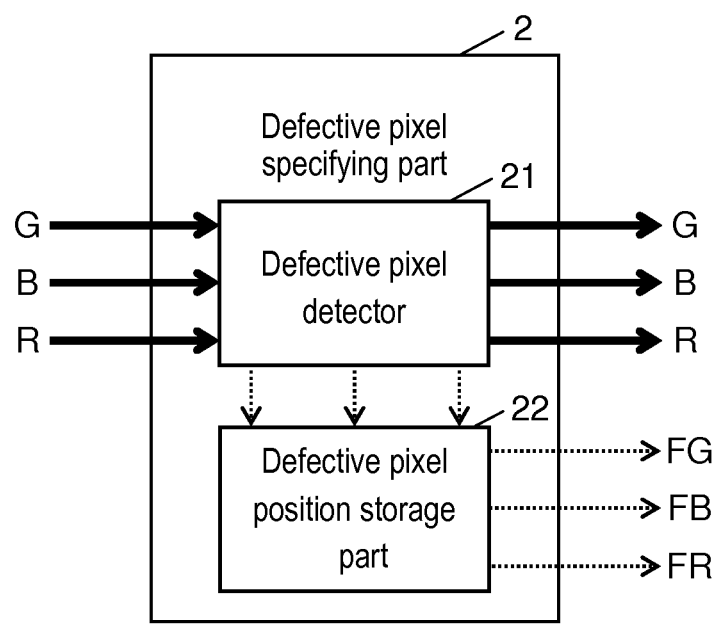
FIG. 3 is a block diagram illustrating one example of a defective pixel specifying part.

FIG. 3 is a block diagram illustrating one example of a defective pixel specifying part. As shown in FIG. 3, defective pixel specifying part 2 has defective pixel detector 21 and defective pixel position storage part 22.

Figure 7A:
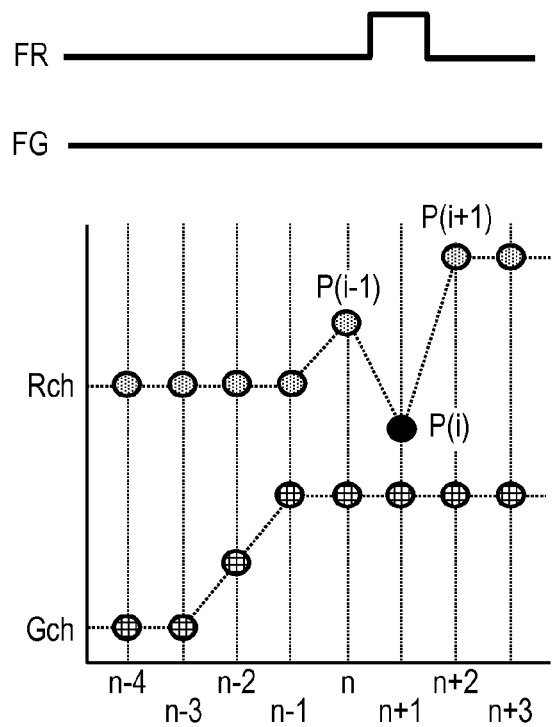
FIG. 7A is an explanatory diagram for describing operations in respective parts.

Defective pixel detector 21 detects defective pixels from the image signals of R, G, and B channels (Rch, Gch, and Bch) input from imaging unit 1. Defective pixel position storage part 22 stores coordinates indicating positions of the defective pixels detected in the respective R, G, and B channel image signals. Defective pixel position storage part 22 outputs a signal of a defective pixel flag indicating "1" as shown in FIG. 7A at a timing when R, G, and B-channel image signals output from defective pixel specifying part 2 become defective pixels. FIG. 7A shows that a defective pixel P(i) is present in Rch and a signal "1" is output to the defective pixel flags FR at a timing when a signal P(i) of defective pixel is present.

Defective pixel specifying part 2 according to the embodiment has defective pixel detector 21 and defective pixel position storage part 22. However, defective pixel specifying part 2 may not be provided with defective pixel detector 21, and may detect a position of a defective pixel in advance, so as to store the coordinates of the defective pixel in defective pixel position storage part 22. Further, defective pixel position storage part 22 may not be provided, and the signal of the defective pixel flag may be output every time when defective pixel detector 21 detects a defective pixel. Further, the example has been described in which defective pixel position storage part 22 stores the coordinates indicating the position of the defective pixel. However, the signal of the defective pixel flag for all the pixels including the defective pixel detected by defective pixel detector 21 may be stored.

Figure 4:
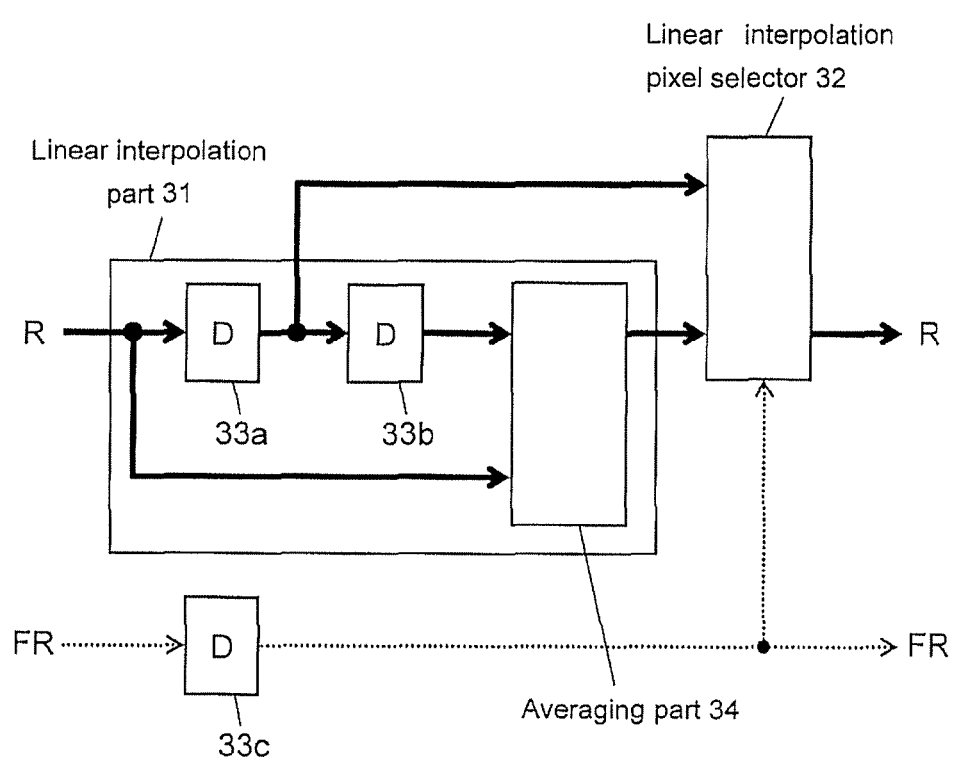
FIG. 4 is a block diagram illustrating one example of a first defective pixel corrector.

FIG. 4 is a block diagram illustrating one example of the first defective pixel corrector. Corrector 3R for correcting Rch image signal is described as an example, but correctors 3G and 3B have similar configurations.

First detective pixel corrector 3 includes linear interpolation part 31 and linear interpolation pixel selector 32. Interpolation part 31 performs an averaging signal values of pixels around the detective pixel with respect to the defective pixel included in the Rch image signal for finding the linear interpolation value. Pixel selector 32 selects either one of the signal of the linear interpolation value obtained by linear interpolation part 31 or a signal of a target pixel based on the signal of the defective pixel flag for outputting the selected signal.

Further, linear interpolation part 31 includes D flip-flops 33a and 33b for synchronizing signals of pixels before and after a target pixel so as to output the signals, and averaging part 34 for averaging signal values of the pixels before and after the target pixel so as to obtain a linear interpolation value. As a result, linear interpolation part 31 generates a value obtained by averaging the signal values of the pixels before and after the target pixel as the linear interpolation value.

A signal of defective pixel flag FR having passed through D flip-flop 33c is input into linear interpolation pixel selector 32 so as to be timed with the Rch image signal having passed through D flip-flop 33a.

Figure 7B:
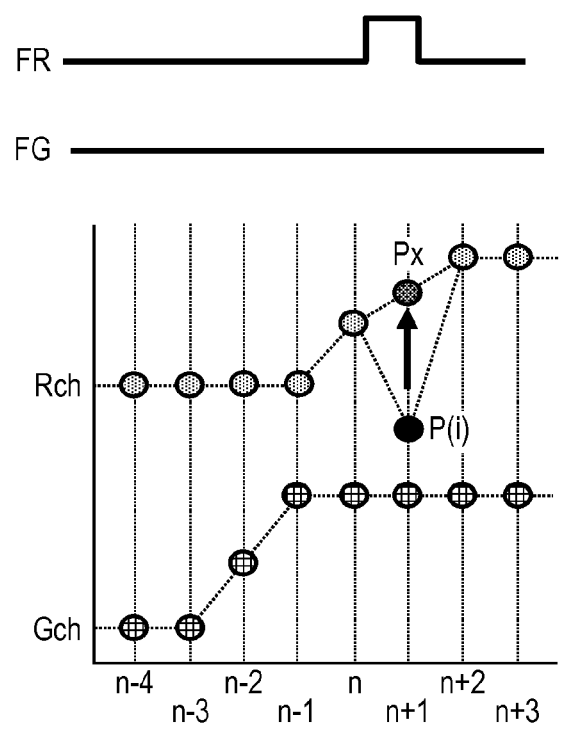
FIG. 7B is an explanatory diagram for describing the operations in the respective parts.

When the signal of defective pixel flag FR indicates that the target pixel is a defective pixel, linear interpolation pixel selector 32 selects and outputs signal Px of data of the linear interpolation value output from linear interpolation part 31 as indicated by an arrow of FIG. 7B. When the target pixel is not a defective pixel, linear interpolation pixel selector 32 directly selects and outputs a signal value of the target pixel. The first defective pixel correction process is performed in this manner.

In the described example, linear interpolation part 31 according to the embodiment is mounted with only D flip-flops 33a and 33b for synchronizing adjacent pixels of the target pixel in a horizontal direction, and a one-dimensional interpolation process is performed. However, a delay line for synchronization also in a vertical direction may be provided so that a two-dimensional interpolation process is performed.

Figure 5:
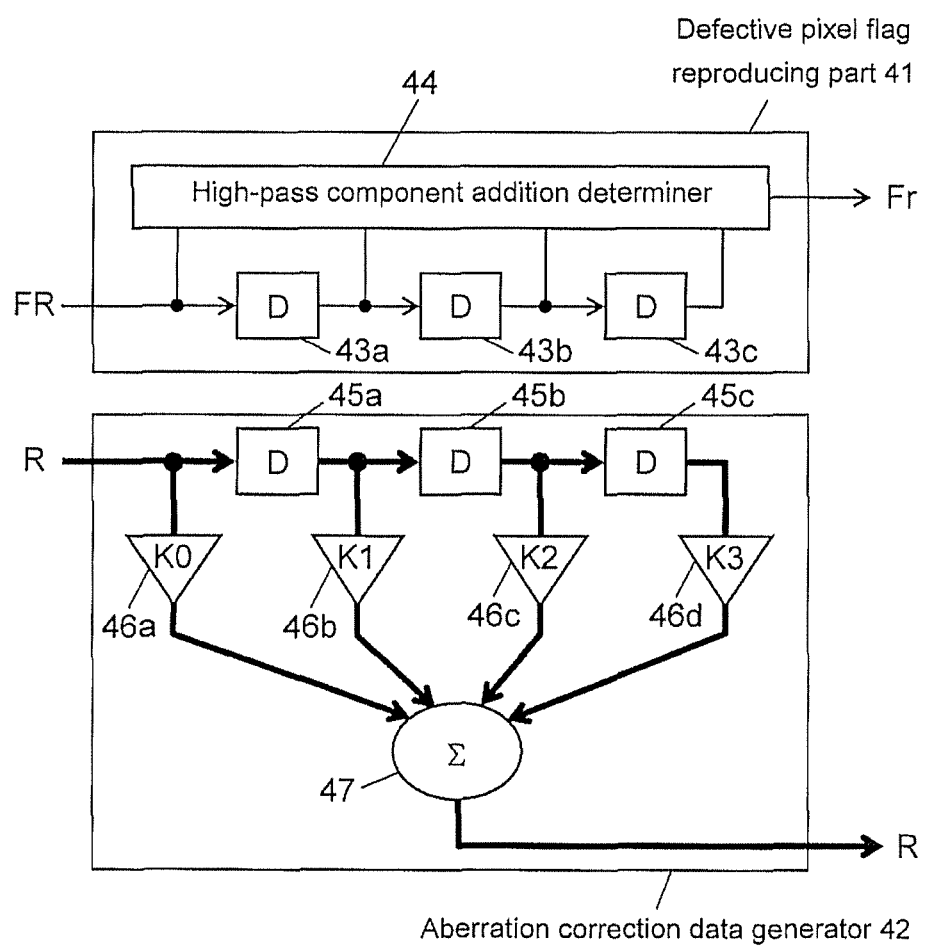
FIG. 5 is a block diagram illustrating one example of an aberration corrector.

FIG. 5 is a block diagram illustrating one example of the aberration corrector. Corrector 4R for correcting aberration of the Rch image signal is described as an example, but corrector 4B has a similar configuration.

As shown in FIG. 5, aberration corrector 4 has defective pixel flag reproducing part 41 and aberration correction data generator 42.

Defective pixel flag reproducing part 41 has three D flip-flops 43a, 43b, 43c into which defective pixel flags FR are input, respectively, and high-pass component addition determiner 44 being comprised of OR gates. When the Rch image signal to be used for generating aberration correction data includes a defective pixel, a signal of "1" is generated as a defective pixel flag Fr, and when a defective pixel is not included, a signal of "0" is generated and output as the defective pixel flag Fr. The signal of the defective pixel flag Fr generated by defective pixel flag reproducing part 41 is output at the same timing as the aberration correction data, described later.

Aberration correction data generator 42 has three D flip-flops 45a, 45b, and 45c, and multipliers 46a, 46b, 46c, and 46d, and adder 47. An image signal of a position in the Rch image signal determined according to an amount of shift from the Gch image signal is stored in D flip-flops 45a, 45b, and 45c. For example, when the Rch image signal shifts by two pixels from the Gch image signal in the horizontal direction, centering around a position shifting from the Gch image signal by two pixels in the horizontal direction, namely, centering around an n+1th Rch image signal, a signal of a pixel around the n+1th Rch pixel is stored at a timing at which the Rch image signal corresponding to an n−1th Gch pixel is generated.

Multipliers 46a, 46b, 46c, and 46d multiply the Rch image signals of D flip-flops 45a, 45b, and 45c by specified coefficients determined according to the amount of shift from the Gch image signals. Adder 47 adds output values from multipliers 46a, 46b, 46c, and 46d, so that aberration correction data is generated. As a result, Rch image signals whose phases match with those of the Gch image signals can be generated and output.

Figure 8A:
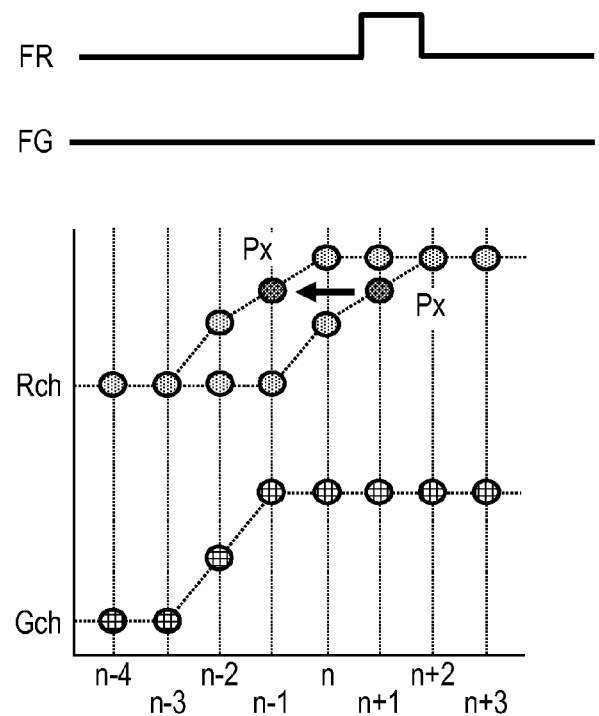
FIG. 8A is an explanatory diagram for describing operations in respective parts.

FIG. 8A is a diagram for describing a state of the aberration correction process, and as shown in FIG. 8A, the aberration correction process is performed on the Rch image signals subjected to the first defective pixel correction process based on the Gch image signal of a specific color.

In the described example, when the Rch image signals to be used for the generation of aberration correction data includes at least one defective pixel in the high-pass component addition determiner 44, defective pixel flag reproducing part 41 regenerates the defective pixel flag Fr of 1 bit indicating "1". However, the defective pixel flag Fr to be regenerated may be constituted by a plurality of bits, and defective pixel flag reproducing part 41 may regenerate the defective pixel flag Fr according to a ratio of contribution to aberration correction data to be generated so that its value is larger when an image signal on a position close to a target pixel is a defective pixel or when the coefficients of the multipliers are large.

In the described example, aberration correction data generator 42 performs the one-dimensional interpolation process configured by only flip-flops for synchronizing pixels to be used for the generation of the aberration correction data in the horizontal direction. However, the delay line for synchronization also in the vertical direction may be provided so that the two-dimensional interpolation process is performed, and in this case, the defective pixel flag is also delayed by the same delay amount with image signals by using the delay line to maintain a relative positional relationship with respect to the image signals.

The aberration correction process of the Rch image signal has been described above, but the same applies to the aberration correction process of the Bch image signal. Further, the aberration correction process is not performed on the Gch image signal to be a basis of the aberration correction process, and the Gch image signal is directly output.

Figure 6:
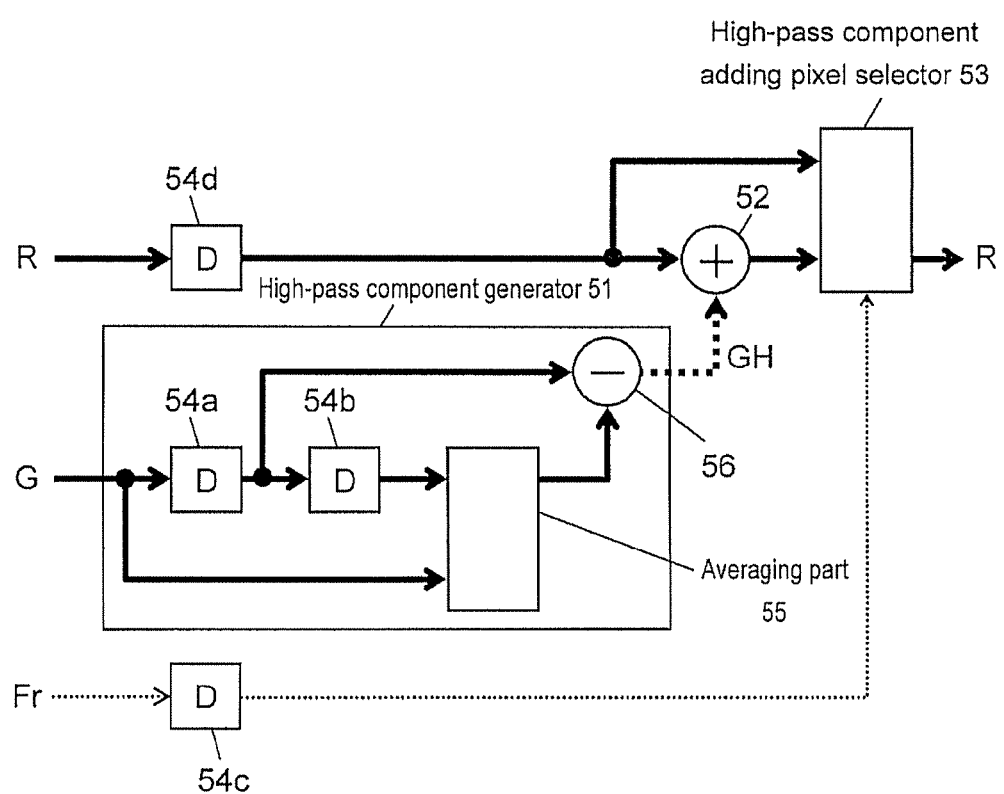
FIG. 6 is a block diagram illustrating one example of a second defective pixel corrector.

FIG. 6 is a block diagram illustrating one example of a second defective pixel corrector. Corrector 5R for the Rch image signal is described as an example.

As shown in FIG. 6, second defective pixel corrector 5 includes high-pass component generator 51, adder 52, and high-pass component adding pixel selector 53.

High-pass component generator 51 includes D flip-flops 54a and 54b, averaging part 55, and subtracter 56. An averaged value of pixels before and after a target pixel that is a signal value of a linear interpolation pixel is subtracted from a signal value of the target pixel in the Gch image signal, so that an obtained value is output as the high-frequency component GH of the Gch image signal.

After the linear interpolation is performed in first defective pixel corrector 3 on a front stage, adder 52 adds the Gch high-frequency component GH to the Rch image signal on which aberration corrector 4 performs aberration correction based on the defective pixel flag Fr. As a result, an Rch image signal on which second defective pixel corrector 5 performs the second defective pixel correction process is generated.

High-pass component adding pixel selector 53 selects a signal value to which the high-frequency component GH is added by adder 52 or an image signal (Rch image signal) of the target pixel based on the output from D flip-flop 54c into which the signal of the defective pixel flag Fr is input and outputs the selected signal.

Figure 8B:
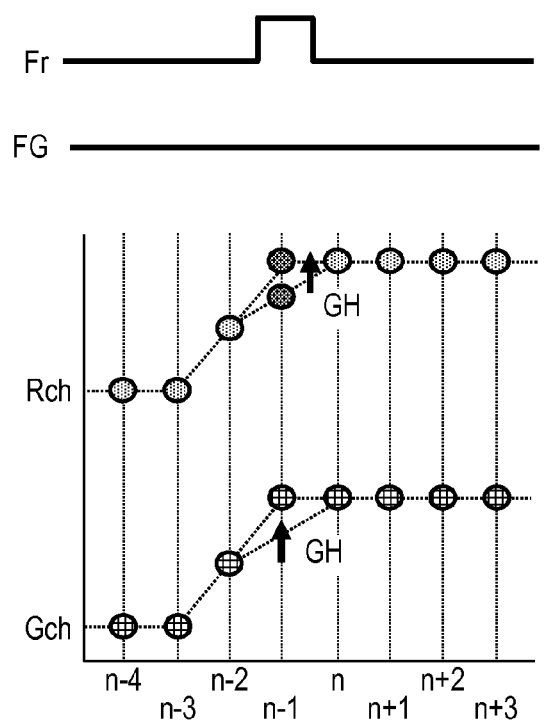
FIG. 8B is an explanatory diagram for describing the operations in the respective parts.

That is, as indicated by an arrow in FIG. 8B, when the signal of the defective pixel flag Fr indicates that the target pixel is a defective pixel, an output signal to which the high-frequency component GH generated by high-pass component generator 51 is added is selected to be output. When the target pixel is not a defective pixel, the image signal of the target pixel is directly selected to be output.

In the described example, high-pass component generator 51 according to the embodiment performs the one-dimensional interpolation process configured only by D flip-flops 54a and 54b for synchronizing adjacent pixels of the target pixel in the horizontal direction. However, the delay line may be provided for synchronization also in the vertical direction so that the two-dimensional interpolation process is performed.

Further, the description has been made of the case where the second defective pixel correction process is performed on the Rch image signal, but the same applies to the Bch image signal. Further, as to the Gch image signal, the high-frequency components RH and BH are generated from the Rch and Bch image signals, and the high-frequency component generated from at least one of the high-frequency components RH and BH is added to the Gch image signal that has been subjected to the first defective pixel correction process, so that an image signal on which the second defective pixel correction process is performed can be generated.

The above embodiment has described the example where aberration corrector 4 and second defective pixel corrector 5 are provided independently, and after the aberration correction process in aberration corrector 4, second defective pixel corrector 5 performs the second defective pixel correction process. However, second defective pixel corrector 5 may have aberration corrector 4 for performing the aberration correction process. That is, after first defective pixel corrector 3 performs the correction process, second defective pixel corrector 5 may perform the aberration correction process based on an image signal of a specific color, and may perform the second defective pixel correction process for adding a high-frequency component generated from an image signal of a different color signal to a pixel on which first defective pixel corrector 3 performs the correction process and a pixel generated in the aberration correction process using the pixel subjected to the correction process.

In this case, in a defective pixel correction step of second defective pixel corrector 5, the second defective pixel correction process is performed simultaneously with the aberration correction process in aberration corrector 4 in the aberration correction step or after the aberration correction process performed in aberration corrector 4.

With reference to FIGS. 9A to 9D, another defective pixel correction process in a case where there is an influence of magnification chromatic aberration is described below as a comparative example of the present technique. FIGS. 9A to 9D illustrate a case where the Rch image signal shifts from the Gch image signal in the horizontal direction by two pixels due to the influence of the magnification chromatic aberration.

Figure 9A:
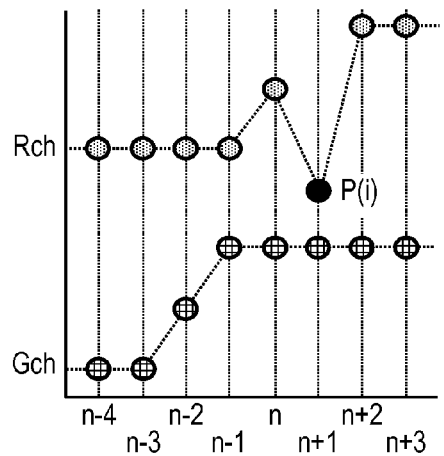
FIG. 9A is an explanatory diagram for describing an effect of the present technique.
Figure 9B:
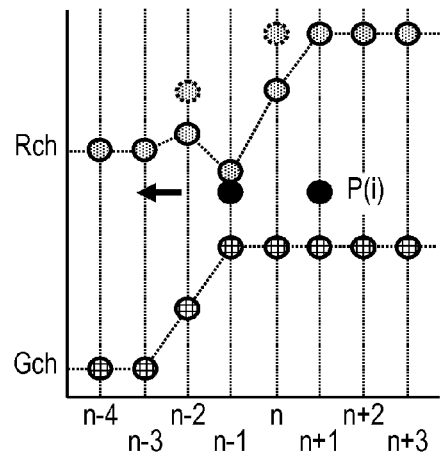
FIG. 9B is an explanatory diagram for describing the effect of the present technique.

As shown in FIG. 9A, a defective pixel P(i) is present in the Rch image signal. As shown in FIG. 9B, the aberration correction process is performed on the image signal on the Rch pixel position based on Gch pixel position, and relative positions of R, G, and B is matched with a position where Gch is actually imaged. In this case, however, as shown in FIG. 9B, the aberration correction process is performed on the defective pixel, and the defective pixel itself spreads two-dimensionally due to the interpolation process using a two-dimensional filter.

Figure 9C:
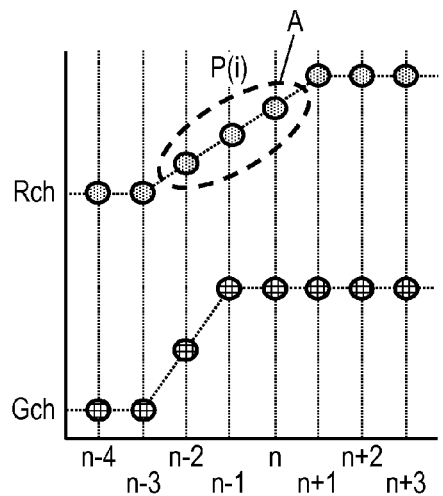
FIG. 9C is an explanatory diagram for describing the effect of the present technique.
Figure 9D:
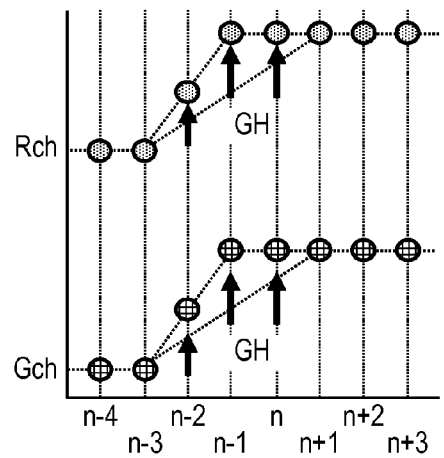
FIG. 9D is an explanatory diagram for describing the effect of the present technique.

For this reason, when the linear interpolation process is performed after the aberration correction process as shown in FIG. 9C, the linear interpolation process needs to be performed on pixels including other pixels around the defective pixel P(i) indicated by a dotted line A. Further, since a position of a normal pixel to be referenced when the linear interpolation value is generated is separated from a defective pixel in the linear interpolation process, a correlation of image signals is poor, and thus interpolation accuracy is deteriorated.

Further, when the process for correcting the high-frequency component is performed thereafter, as shown in FIG.

9D, the number of defective pixels to be corrected increases, and corrected image signals whose accuracy is deteriorated are corrected.

The defective pixel correction apparatus of the present technique includes the first defective pixel corrector for specifying a defective pixel included in an image signal of each of color signals sent from the imaging unit, and obtaining the linear interpolation value from pixels around the defective pixel so as to perform the first defective pixel correction process on the defective pixel by linear interpolation, and the second defective pixel corrector for performing the aberration correction process based on an image signal of a specific color after the first defective pixel correction process, and performing the second defective pixel correction process different from the first defective pixel correction process on the pixel subjected to the first defective pixel correction process.

Therefore, also when the magnification chromatic aberration have an influence on image signals, the first defective pixel correction process is performed only on a color signal where a defective pixel is generated, and the second defective pixel correction process is performed also using color signals other than the color signal where a defective pixel is generated simultaneously with the aberration correction process or after the aberration correction process, so that the defective pixel can be accurately corrected. As a result, even when the magnification chromatic aberration have an influence on image signals, a more natural defective pixel correction process can be realized by using a correlation with respect to another color signal of the defective pixel without spreading of the defective pixel.

Further, the correction apparatus of the present technique includes the defective pixel specifying part for specifying the defective pixel in the image signal of each of the color signals sent from the imaging unit. The defective pixel specifying part outputs the signal of the defective pixel flag indicating a position of a defective pixel, and performs, on the defective pixel specified by the defective pixel flag, the correction process by the first defective pixel correction process and the second defective pixel correction process.

The embodiment has been described above as an example of the technique in this disclosure. The accompanying drawings and the detailed description are provided for the description.

Therefore, the components described in the accompanying drawings and the detailed description include not only the components necessary for solving the problem but also include, in order to illustrate the technique, components that are not essential for solving the problem. For this reason, even if these unessential components are described in the accompanying drawings and the detailed description, the unessential components should not be immediately granted as being essential.

Further, since the embodiments illustrate the technique of the present disclosure, various changes, replacements, additions, and omissions can be performed within the scope of claims or the scope equivalent thereto.

What is claimed is:

1. A defective pixel correction method comprising:
    a first defective pixel correction step of specifying a defective pixel included in an image signal of each of color signals sent from an imaging unit, and obtaining a linear interpolation value from pixels around the defective pixel to perform a first defective pixel correction process on the defective pixel by the linear interpolation, and
    a second defective pixel correction step of performing an aberration correction process based on an image signal of a specific color after the first defective pixel correction process, and performing a second defective pixel correction process different from the first defective pixel correction process on the pixel subjected to the first defective pixel correction process,
    wherein the second defective pixel correction process is a correction process for adding a high-frequency component, generated from an image signal of a different color signal, to the pixel subjected to the first defective pixel correction process and a pixel generated in the aberration correction process using the pixel subjected to the first defective pixel correction process.

2. The defective pixel correction method according to claim 1, wherein
    the second defective pixel correction step has an aberration correction step of performing the aberration correction process based on the image signal of the specific color, and
    the second defective pixel correction process is performed simultaneously with the aberration correction process performed in the aberration correction step or after the aberration correction process performed in the aberration correction step.

3. The defective pixel correction method according to claim 1, further comprising a defective pixel specifying step of specifying the defective pixel in the image signal of each of the color signals sent from the imaging unit,
    wherein the first defective pixel correction process and the second defective pixel correction process are performed on the defective pixel specified in the defective pixel specifying step.

4. The defective pixel correction method according to claim 3, wherein
    in the defective pixel specifying step,
        a signal of a defective pixel flag indicating a position of the defective pixel is output, and
        the first defective pixel correction process and the second defective pixel correction process are performed on the defective pixel specified by the defective pixel flag.

5. The defective pixel correction method according to claim 4, wherein the defective pixel flag is output together with each of the image signals.

* * * * *